(12) United States Patent
Wang et al.

(10) Patent No.: US 8,312,190 B2
(45) Date of Patent: Nov. 13, 2012

(54) PROTOCOL TRANSLATION IN A SERIAL BUFFER

(75) Inventors: Chi-Lie Wang, Milpitas, CA (US); Jason Z. Mo, Fremont, CA (US)

(73) Assignee: Integrated Device Technology, inc., San Jose, CA (US)

( * ) Notice: Subject to any disclaimer, the term of this patent is extended or adjusted under 35 U.S.C. 154(b) by 692 days.

(21) Appl. No.: 12/043,929

(22) Filed: Mar. 6, 2008

(65) Prior Publication Data

US 2009/0228621 A1  Sep. 10, 2009

(51) Int. Cl.
| | |
|---|---|
| G06F 3/00 | (2006.01) |
| G06F 5/00 | (2006.01) |
| G06F 13/12 | (2006.01) |
| G06F 13/42 | (2006.01) |
| G06F 13/14 | (2006.01) |
| H04L 12/56 | (2006.01) |
| H04J 3/16 | (2006.01) |

(52) U.S. Cl. ............. 710/62; 710/30; 710/52; 710/105; 710/305; 370/392; 370/466

(58) Field of Classification Search .................. None
See application file for complete search history.

(56) References Cited

U.S. PATENT DOCUMENTS

| | | | |
|---|---|---|---|
| 4,214,305 A | 7/1980 | Tokita | |
| 4,335,277 A | 6/1982 | Puri | |
| 4,782,485 A | 11/1988 | Gollub | |
| 4,866,704 A | 9/1989 | Bergman | |
| 5,018,136 A | 5/1991 | Gollub | |
| 5,107,489 A | 4/1992 | Brown et al. | |
| 5,245,704 A | 9/1993 | Weber et al. | |
| 5,257,384 A | 10/1993 | Farrand et al. | |
| 5,313,454 A | 5/1994 | Bustini et al. | |
| 5,426,643 A | 6/1995 | Smolinske et al. | |
| 5,530,902 A * | 6/1996 | McRoberts et al. | ............ 710/28 |
| 5,572,697 A | 11/1996 | Chevalier et al. | |
| 5,655,140 A | 8/1997 | Haddock | |
| 5,717,883 A | 2/1998 | Sager | |
| 5,777,547 A | 7/1998 | Waldrop | |
| 5,916,309 A | 6/1999 | Brown et al. | |
| 5,924,112 A | 7/1999 | Barber et al. | |
| 5,951,706 A | 9/1999 | Benner | |
| 5,983,301 A | 11/1999 | Baker et al. | |
| 6,046,817 A | 4/2000 | Brown et al. | |
| 6,047,319 A | 4/2000 | Olson | |

(Continued)

OTHER PUBLICATIONS

"Mercury Computer System Says . . . Serial RapidIO-to-PCIe Bridge IP Core Available for Both ASICs and FPGAs." connectivityZONE Product Review. Oct. 30, 2006.*

(Continued)

Primary Examiner — Chun-Kuan Lee
Assistant Examiner — Henry Yu
(74) Attorney, Agent, or Firm — Bever, Hoffman & Harms

(57) ABSTRACT

A serial buffer includes a first port configured to operate in accordance with a first serial protocol and a second port configured to operate in accordance with a second serial protocol. A first translation circuit of the serial buffer allows packets received on the first port to be translated to the second serial protocol, and then transferred to the second port. A second translation circuit of the serial buffer allows packets received on the second port to be translated to the first serial protocol, and then transferred to the first port. Translations may be performed in response to information included in the headers of the received packets, including source ID values, destination ID values and/or case number values.

15 Claims, 5 Drawing Sheets

U.S. PATENT DOCUMENTS

| | | | |
|---|---|---|---|
| 6,061,089 | A | 5/2000 | Tonkin et al. |
| 6,084,631 | A | 7/2000 | Tonkin et al. |
| 6,157,621 | A | 12/2000 | Brown et al. |
| 6,233,629 | B1 | 5/2001 | Castellano |
| 6,271,866 | B1 | 8/2001 | Hancock et al. |
| 6,333,938 | B1 | 12/2001 | Baker |
| 6,347,344 | B1 | 2/2002 | Baker et al. |
| 6,425,021 | B1 | 7/2002 | Ghodrat et al. |
| 6,442,687 | B1 | 8/2002 | Savage |
| 6,510,138 | B1 | 1/2003 | Pannell |
| 6,546,496 | B1 | 4/2003 | Wang et al. |
| 6,564,271 | B2 | 5/2003 | Micalizzi, Jr. et al. |
| 6,581,175 | B1 | 6/2003 | Crump et al. |
| 6,631,429 | B2 | 10/2003 | Cota-Robles et al. |
| 6,636,483 | B1 | 10/2003 | Pannell |
| 6,658,477 | B1 | 12/2003 | Lisitsa et al. |
| 6,748,020 | B1 | 6/2004 | Eifrig et al. |
| 6,862,298 | B1 | 3/2005 | Smith et al. |
| 6,907,479 | B2 | 6/2005 | Karnstedt et al. |
| 6,944,186 | B2 | 9/2005 | Zaun et al. |
| 6,985,969 | B1 | 1/2006 | Cheng |
| 6,993,602 | B2 | 1/2006 | Merrill et al. |
| 7,013,354 | B1 * | 3/2006 | Beck et al. ............... 710/105 |
| 7,088,735 | B1 | 8/2006 | Reohr, Jr. et al. |
| 7,212,962 | B2 | 5/2007 | Masushige et al. |
| 7,213,094 | B2 | 5/2007 | Edirisooriya et al. |
| 7,436,858 | B2 | 10/2008 | Goren et al. |
| 7,594,002 | B1 * | 9/2009 | Thorpe et al. ............. 709/219 |
| 7,617,346 | B2 | 11/2009 | Wang et al. |
| 7,631,128 | B1 | 12/2009 | Sgrosso et al. |
| 7,680,944 | B1 | 3/2010 | Taghizadeh et al. |
| 7,707,335 | B2 | 4/2010 | Lidji et al. |
| 7,710,969 | B2 * | 5/2010 | Szczepanek et al. ......... 370/392 |
| 7,764,608 | B2 | 7/2010 | Breynaert et al. |
| 2001/0054116 | A1 | 12/2001 | Cheng |
| 2002/0080791 | A1 | 6/2002 | Sylvain |
| 2002/0171741 | A1 | 11/2002 | Tonkin et al. |
| 2002/0181481 | A1 | 12/2002 | Iny |
| 2004/0103333 | A1 | 5/2004 | Martwick et al. |
| 2004/0225779 | A1 | 11/2004 | Zhao et al. |
| 2004/0240478 | A1 | 12/2004 | Goren et al. |
| 2005/0100049 | A1 | 5/2005 | Siminoff |
| 2005/0100114 | A1 | 5/2005 | Satagopan et al. |
| 2005/0105556 | A1 * | 5/2005 | Joung et al. ............... 370/469 |
| 2005/0135390 | A1 | 6/2005 | Anderson et al. |
| 2005/0144341 | A1 | 6/2005 | Schmidt et al. |
| 2005/0246424 | A1 | 11/2005 | Panec et al. |
| 2005/0254518 | A1 * | 11/2005 | Fujimori ............... 370/466 |
| 2005/0283598 | A1 | 12/2005 | Gaskins et al. |
| 2006/0018329 | A1 | 1/2006 | Nielsen et al. |
| 2006/0056435 | A1 | 3/2006 | Biran et al. |
| 2006/0153238 | A1 | 7/2006 | Bar-On et al. |
| 2006/0224812 | A1 | 10/2006 | Kapoor et al. |
| 2006/0251088 | A1 | 11/2006 | Thubert et al. |
| 2007/0050564 | A1 | 3/2007 | Gunna et al. |
| 2007/0110046 | A1 | 5/2007 | Farrell et al. |
| 2007/0130410 | A1 | 6/2007 | Keller et al. |
| 2007/0230403 | A1 | 10/2007 | Douglas et al. |
| 2008/0008211 | A1 | 1/2008 | Zilbershtein et al. |
| 2008/0082840 | A1 | 4/2008 | Kendall et al. |
| 2008/0096433 | A1 * | 4/2008 | Bixler et al. ............... 439/637 |
| 2008/0205422 | A1 | 8/2008 | Wang et al. |
| 2008/0205438 | A1 | 8/2008 | Juan et al. |
| 2008/0209084 | A1 | 8/2008 | Wang et al. |
| 2008/0209089 | A1 | 8/2008 | Mo et al. |
| 2008/0301327 | A1 | 12/2008 | Archer et al. |
| 2009/0052323 | A1 | 2/2009 | Breynaert et al. |
| 2009/0086751 | A1 | 4/2009 | Wang |
| 2009/0181663 | A1 | 7/2009 | Hu et al. |
| 2009/0225770 | A1 | 9/2009 | Wang et al. |
| 2009/0292935 | A1 | 11/2009 | Hallnor et al. |
| 2010/0111526 | A1 | 5/2010 | Bader |

OTHER PUBLICATIONS

Mercury Computer Systems, Inc. article entitled: "Serial Rapid IO-to-PCIe Bridge IP Core Available for Both ASICs and FPGAs . . . " dated Oct. 30, 2006; 2 pages.

RapidIO Interconnect Specification, Part VI: Physical Layer 1x/4x LP Serial Specification, Rev. 1.2, Jun. 2002.

* cited by examiner

PROTOCOL TRANSLATION IN A SERIAL BUFFER

RELATED APPLICATIONS

The present application is related to, and incorporates by reference, the following commonly owned, co-filed U.S. patent application Ser. No. 12/043,918 filed by Chi-Lie Wang and Jason Z. Mo on Mar. 6, 2008, entitled "Method To Support Flexible Data Transport On Serial Protocols"; Ser. No. 12/043,934 also filed by Chi-Lie Wang and Jason Z. Mo on Mar. 6, 2008, entitled "Serial Buffer To Support Reliable Connection Between Rapid I/O End-Point And FPGA Lite-Weight Protocols"; Ser. No. 12/043,940 filed by Chi-Lie Wang on Mar. 6, 2008, entitled "Power Management On sRIO Endpoint"; Ser. No. 12/043,943 filed by Chi-Lie Wang and Jason Z. Mo on Mar. 6, 2008, entitled "Serial Buffer To Support Rapid I/O Logic Layer Out Of Order Response With Data Retransmission"; and Ser. No. 12/043,944 filed by Chi-Lie Wang, Jason Z. Mo, Calvin Nguyen and Bertan Tezcan on Mar. 6, 2008, entitled "Method To Support Lossless Real Time Data Sampling And Processing On Rapid I/O End-Point".

FIELD OF THE INVENTION

The present invention relates to a multi-port serial buffer designed to provide reliable connections between a first system that implements first serial protocol and a second system that implements a second serial protocol.

RELATED ART

It is desirable for a multi-port serial buffer to be able to efficiently and flexibly store and retrieve packet data. It would further be desirable to have a multi-port serial buffer that enables efficient and flexible transfer of packet data between the various ports, particularly if the ports are implementing different serial protocols.

SUMMARY

Accordingly, the present invention provides a multi-port serial buffer having a first port configured to implement an sRIO protocol (to enable connection to an sRIO endpoint), and a second port to be configured to implement a Lite-weight protocol (to enable connection to a field programmable device, such as an FPGA). The serial buffer implements protocol translation to translate from Lite-weight protocol on the second port to sRIO protocol on the first port (and vice versa).

In accordance with one aspect of the present invention, the serial buffer includes sRIO-to-Lite translation logic, which translates incoming sRIO protocol packets (sRIO packets) received from the first port into Lite-weight protocol packets (Lite packets), which are transmitted to the second port. In general, the sRIO-to-Lite translation logic translates an incoming sRIO packet to an outgoing Lite packet by modifying the header of the incoming sRIO packet to create a header that is consistent with the Lite-weight protocol. More specifically, a source identification (ID) value in the header of the incoming sRIO packet is used to look up a corresponding case number value, which is included in the header of the translated Lite packet.

In accordance with another aspect of the present invention, the serial buffer includes Lite-to-sRIO translation logic, which translates incoming Lite packets received from the second port into sRIO packets, which are transmitted to the first port. In general, the Lite-to-sRIO translation logic translates an incoming Lite packet to an outgoing sRIO packet by modifying the header of the incoming Lite packet to create a header that is consistent with the sRIO protocol. The Lite-to-sRIO translation logic may be configured to operate in either a packet-based mode or a queue-based mode. In the packet-based mode, a case number value in the header of the received Lite packet is used to look up predetermined sRIO header information, which is included in the header of the translated sRIO packet. In the queue-based mode, the incoming Lite packet is stored in a queue of the serial buffer. A case number value associated with this queue is used to look up predetermined sRIO header information, which is included in the header of the translated sRIO packet.

In accordance with one embodiment of the present invention, the Lite-to-sRIO translation logic also includes logic for segmenting received Lite packets that are not double-word aligned in the manner required by the sRIO protocol.

The present invention will be more fully understood in view of the following description and drawings.

DETAILED DESCRIPTION

Figure 1:
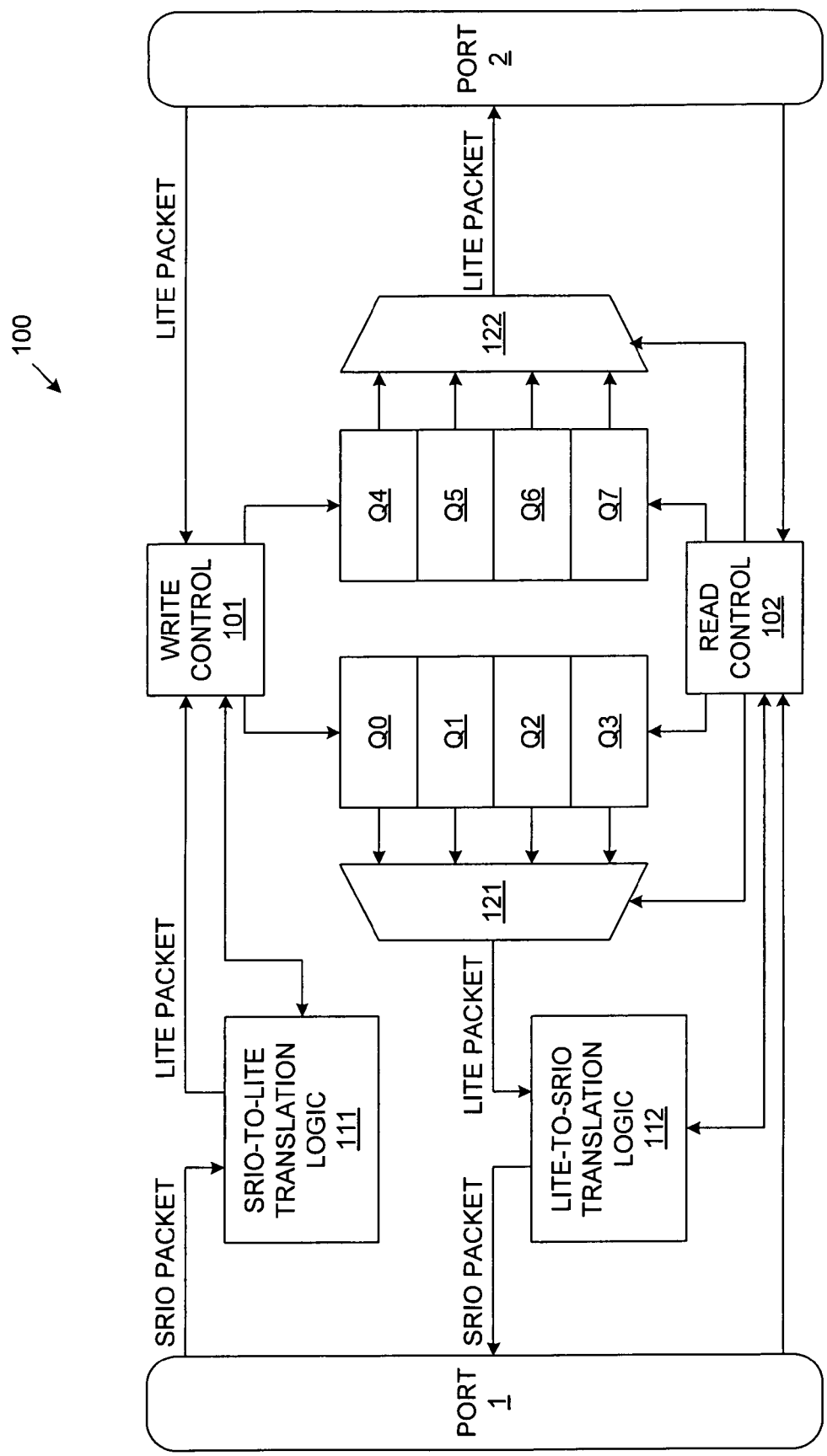
FIG. 1 is a block diagram of a multi-port serial buffer in accordance with one embodiment of the present invention.

FIG. 1 is a block diagram of a serial buffer 100 in accordance with one embodiment of the present invention. Serial buffer 100 includes a first port 1, a second port 2, memory queues Q0-Q7, write control logic 101, read control logic 102, sRIO-to-Lite translation logic 111, Lite-to-sRIO translation logic 112, and output multiplexers 121-122.

In the described embodiments, the first port 1 of serial buffer 100 is configured to operate in accordance with an sRIO protocol, and provides an interface to an sRIO endpoint (not shown). The second port 2 of serial buffer 100 is configured to operate in accordance with a Lite-weight protocol, and provides an interface to a Lite-weight protocol device, such as a field programmable device (not shown). Thus, the first port 1 sends/receives sRIO packets, and the second port 2 sends/receives Lite packets.

In accordance with one embodiment, sRIO-to-Lite translation logic 111 is enabled, such that incoming sRIO packets received from the first port 1 are translated to create corresponding Lite packets. Write control logic 101 causes these translated Lite packets to be written to queues Q4-Q7. Read control logic 102 subsequently causes these translated Lite packets to be read from queues Q4-Q7, and transferred to the second port 2 (through output multiplexer 122). In this manner, serial buffer 100 translates sRIO packets received by the first port 1 into Lite packets, which are transmitted to the second port 2.

Write control logic 101 also causes Lite packets received from the second port 2 to be written to queues Q0-Q3. Read control logic 102 subsequently causes these Lite packets to be read from queues Q0-Q3, and transferred to Lite-to-sRIO translation logic 112 (through output multiplexer 121). In accordance with one embodiment, Lite-to-sRIO translation logic 112 is enabled, such that the received Lite packets are translated into corresponding sRIO packets. In this manner, serial buffer 100 translates Lite packets received by the second port 2 into sRIO packets, which are transmitted to the first port 1.

In general, sRIO-to-Lite translation logic 111 translates an incoming sRIO packet to a corresponding Lite packet by modifying a header of the incoming sRIO packet to create a header that is consistent with the Lite-weight protocol. More specifically, a source identification (ID) value in the header of the incoming sRIO packet is used to look up a corresponding case number value, which is included in the header of the translated Lite packet.

Similarly, Lite-to-sRIO translation logic 112 translates a received Lite packet into a corresponding sRIO packet by modifying the header of the received Lite packet to create a header that is consistent with the sRIO protocol. Lite-to-sRIO translation logic 112 may be configured to operate in either a packet-based mode or a queue-based mode. In the packet-based mode, a case number value in the header of the received Lite packet is used to look up predetermined sRIO header information, which is included in the header of the translated sRIO packet. In the queue-based mode, the identity of a queue in which the Lite packet is stored is used to look up predetermined sRIO header information, which is included in the header of the translated sRIO packet.

The above-described translations advantageously allow the first port 1 and the second port 2, which run different protocols, to communicate with each other. The present invention will now be described in more detail.

Figure 2:
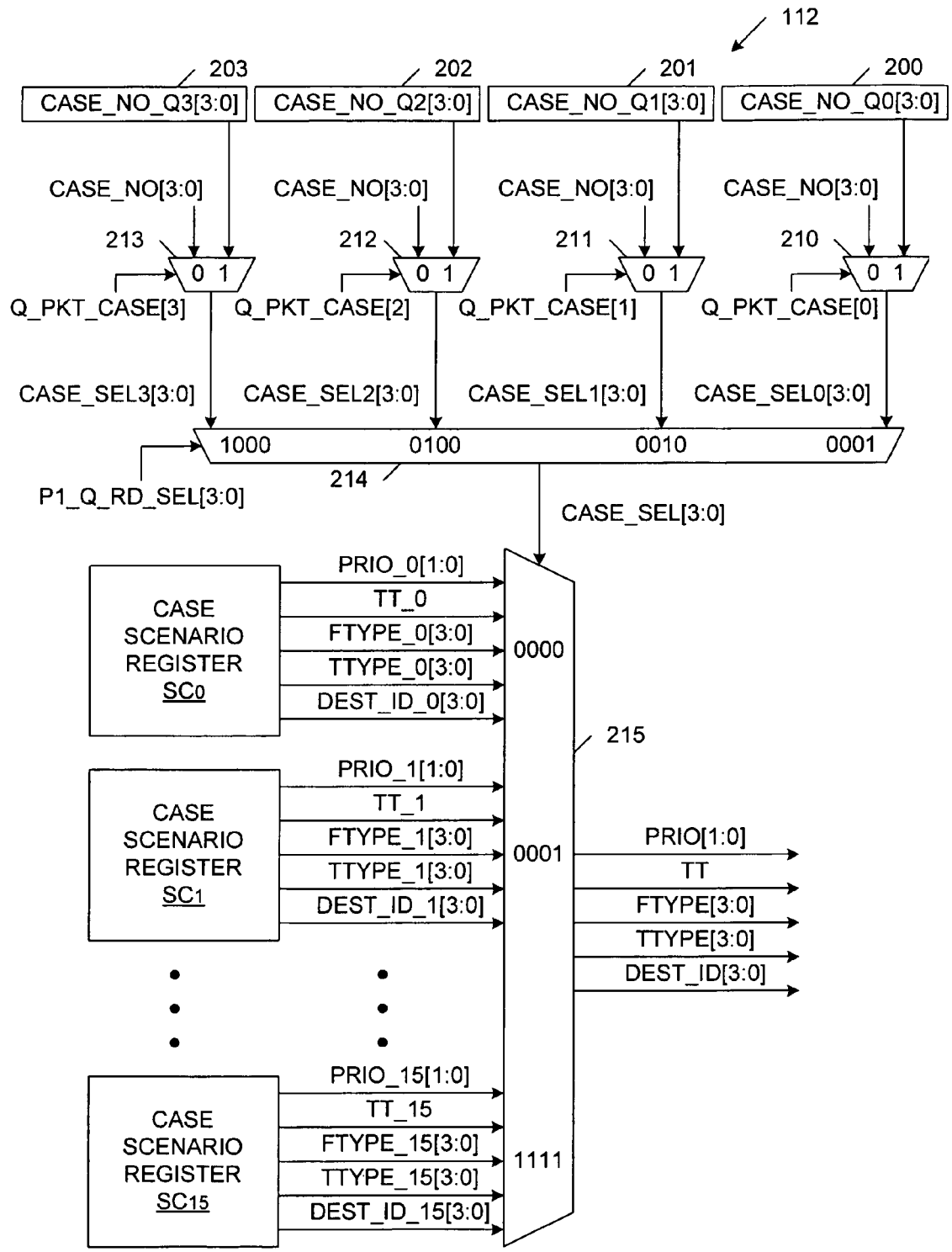
FIG. 2 is a block diagram illustrating translation logic present within the serial buffer of FIG. 1, in accordance with one embodiment of the present invention.

FIG. 2 is a block diagram illustrating circuitry present within Lite-to-SRIO translation logic 112 in accordance with one embodiment of the present invention. Lite-to-SRIO translation logic 112 includes case mode registers 200-203, multiplexers 210-215 and case scenario registers $SC_0$-$SC_{15}$. Each case scenario register $SC_n$ (wherein n=0 to 15, inclusive) stores corresponding sRIO packet header information, including an sRIO packet priority level (PRIO_n[1:0]), a TT value (TT_n), a frame type value (FTYPE_n[3:0]), a transaction type value (TTYPE_n[3:0]) and a destination identification (ID) value (DEST_ID_n[3:0]). A TT value of '0' indicates that a corresponding sRIO packet includes 8-bit source and destination ID values, and a TT value of '1' indicates that a corresponding sRIO packet includes 16-bit source and destination ID values. The frame type value and transaction type values are used to specify different sRIO packet types. The values stored in each case scenario register $SC_n$ can be used to construct sRIO packet headers in a manner understood by those of ordinary skill in the art. In accordance with the present invention, each of the case scenario registers $SC_0$-$SC_{15}$ is programmed to store different corresponding sRIO packet header information.

Case mode registers 200-203 store case number values assigned to queues Q0-Q3, respectively. More specifically, case mode registers 200, 201, 202 and 203 store case number values CASE_NO_Q0[3:0], CASE_NO_Q1[3:0], CASE_NO_Q2[3:0], and CASE_NO_Q3[3:0], respectively, which are assigned to queues Q0, Q1, Q2 and Q3, respectively. Because the case number values CASE_NO_Q0[3:0], CASE_NO_Q1[3:0], CASE_NO_Q2[3:0] and CASE_NO_Q3[3:0] are assigned to specific queues, these case number values may be referred to as queue-based case number values. Each of the queue-based case number values CASE_NO_Q0[3:0], CASE_NO_Q1[3:0], CASE_NO_Q2[3:0] and CASE_NO_Q3[3:0] specifies one of the case scenario registers $SC_0$-$SC_{15}$. Queue-based case number values CASE_NO_Q0[3:0], CASE_NO_Q1[3:0], CASE_NO_Q2[3:0] and CASE_NO_Q3[3:0] are provided to inputs of multiplexers 210, 211, 212 and 213, respectively.

The other inputs of multiplexers 210-213 are configured to receive a case number value (CASE_NO[3:0]), which is present in a Lite packet header read from one of queues Q0-Q3. Because the case number value CASE_NO[3:0] is defined by the contents of a Lite packet, this case number value may be referred to as a packet-based case number value. Each packet-based case number value CASE_NO[3:0] specifies one of the case scenario registers $SC_0$-$SC_{15}$. It is important to note that successive Lite packets may include different packet-based case number values, and may therefore specify different ones of the case scenario registers $SC_0$-$SC_{15}$.

The control terminals of multiplexers 210, 211, 212 and 213 are configured to receive configuration bits Q_PKT_CASE[0], Q_PKT_CASE[1], Q_PKT_CASE[2], and Q_PKT_CASE[3], respectively. Each configuration bit Q_PKT_CASE[m] (wherein m=0 to 3, inclusive) causes the corresponding multiplexer to route either the corresponding queue-based case number value (CASE_NO_Qm[3:0]) or the packet-based case number value (CASE_NO[3:0]). In the described examples, a configuration bit Q_PKT_CASE[m] having a logic '1' value will cause the corresponding multiplexer to route the corresponding queue-based case number value (CASE_NO_Qm[3:0]), while a configuration bit Q_PKT_CASE[m] having a logic '0' value will cause the corresponding multiplexer to route the packet-based case number value (CASE_NO[3:0]). Thus, the configuration bits Q_PKT_CASE[3:0] are used to determine whether a queue-based case number value or a packet-based case number value will be used to select one of the case scenario registers $SC_0$-$SC_{15}$. In one embodiment, the configuration bits Q_PKT_CASE[3:0] are stored in a programmable register of serial buffer 100.

The outputs of multiplexers 210, 211, 212 and 213 are provided to the inputs of multiplexer 214 as the case number values CASE_SEL0[3:0], CASE_SEL1[3:0], CASE_SEL2[3:0], and CASE_SEL3[3:0], respectively. The control terminals of multiplexer 214 are configured to receive a first port queue read select value P1_Q_RD_SEL[3:0], which is provided by read control logic 102. The first port queue read select value P1_Q_RD_SEL[3:0] specifies the highest priority queue having a Lite packet to be transferred out to the first port 1. Multiplexer 214 routes the received case number value (i.e., CASE_SEL0[3:0], CASE_SEL1[3:0], CASE_SEL2[3:0] or CASE_SEL3[3:0]) associated with the queue specified by the first port queue read select value P1_Q_RD_SEL[3:0] as a selected case number value CASE_SEL[3:0].

The contents of case scenario registers $SC_0$-$SC_{15}$ are provided to corresponding inputs of multiplexer 215. The control terminals of multiplexer 215 are configured to receive the selected case number value CASE_SEL[3:0]. In response, multiplexer 215 routes the contents of one of the case scenario registers $SC_0$-$SC_{15}$ as the sRIO packet header information, PRIO[1:0], TT, FTYPE[3:0], TTYPE[3:0] and DEST_ID[3:0]. Lite-to-sRIO translation logic 112 uses the sRIO packet header information routed by multiplexer 215 to construct an sRIO header for the corresponding packet to be transferred to the first port 1.

Figure 3:
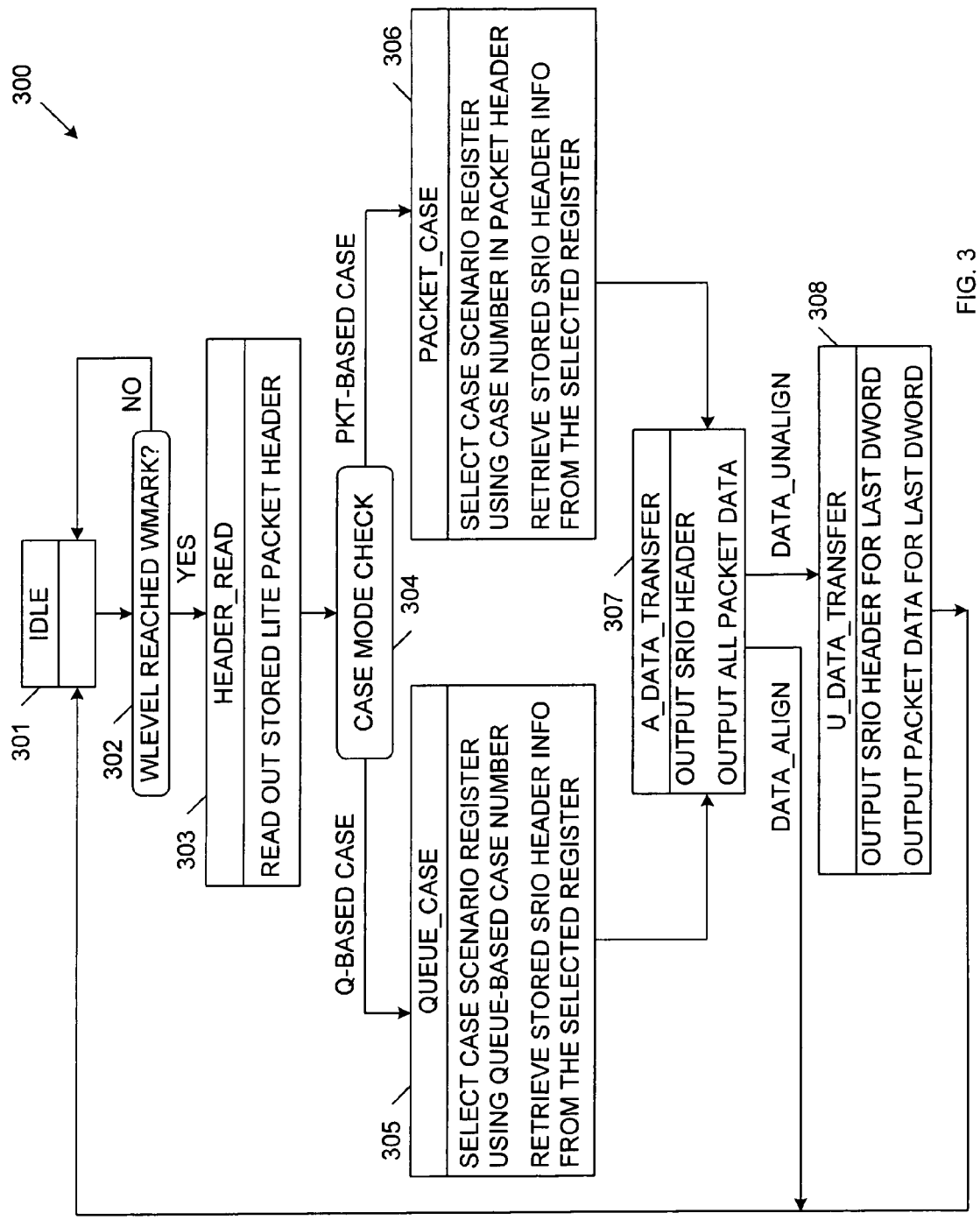
FIG. 3 is a flow diagram illustrating the operation of the translation logic of FIG. 2, in accordance with one embodiment of the present invention.

FIG. 3 is a flow diagram 300 illustrating the operation of Lite-to-sRIO translation logic 112 in accordance with one embodiment of the present invention.

As illustrated in FIG. 3, Lite-to-sRIO translation logic 112 is initially in an IDLE state 301. Lite-to-sRIO translation logic 112 will remain in IDLE state 301 as long as no Lite packets are read from queues Q0-Q3 (Step 302, No branch). While in IDLE state 301, if the water level of any of queues Q0-Q3 reaches its corresponding watermark (Step 302, Yes branch), read control logic 102 will initiate a read operation, thereby causing a Lite packet to be read from the selected queue and provided to Lite-to-sRIO translation logic 112. Note that if the water level exceeds the watermark in more than one of queues Q0-Q3, then read control logic 102 will read a Lite packet from the highest priority queue. Read control logic 102 generates the first port queue read select signal P1_Q_RD_SEL[3:0], which identifies the queue from which the Lite packet is being read. For example, upon determining that a Lite packet is being read from queue Q0, read control logic 102 will generate a first port queue read select signal P1_Q_RD_SEL[3:0] having a value of '0001'. As indicated by FIG. 2, this first port queue read select signal will cause multiplexer 214 to route the case number value CASE_SEL0[3:0] provided by multiplexer 210 to multiplexer 215 as the selected case number CASE_SEL[3:0]. Processing proceeds to HEADER_READ state 303.

Within HEADER_READ state 303, Lite-to-sRIO translation logic 112 reads the packet header of the Lite packet read from the selected queue. In the present example, Lite-to-sRIO translation logic 112 reads a Lite packet header from queue Q0.

Lite-to-sRIO translation logic 112 then determines whether the selected queue should be processed in a queue-based case mode or a packet-based case mode (Step 304). As described above, the configuration bits Q_PKT_CASE[0], Q_PKT_CASE[1], Q_PKT_CASE[2] and Q_PKT_CASE[3] specify whether the corresponding queues Q0, Q1, Q2 and Q3 should be operated in the queue-based case mode or the packet-based case mode. More specifically, a configuration bit Q_PKT_CASE[m] having a logic '1' value specifies that the corresponding queue Qm will operate in the queue-based case mode, while a configuration bit Q_PKT_CASE[m] have a logic '0' value specifies that the corresponding queue Qm will operate in the packet-based case mode. If the configuration bit Q_PKT_CASE[m] associated with the selected queue Qm specifies the queue-based case mode (Step 304, Q-BASED CASE branch), then processing proceeds to QUEUE_CASE state 305. However, if the configuration bit Q_PKT_CASE[m] associated with the selected queue Qm specifies the packet-based case mode (Step 304, PKT-BASED CASE branch), then processing proceeds to PACKET_CASE state 306.

It will first be assumed that the configuration bit Q_PKT_CASE[m] associated with the selected queue Qm specifies the queue-based case mode, such that processing proceeds to QUEUE_CASE state 305. Under these conditions, Lite-to-sRIO translation logic 112 will retrieve the case number value assigned to the selected queue. More specifically, Lite-to-sRIO translation logic 112 will retrieve the queue-based case number value stored in the case mode register 200-203 associated with the selected queue. In the present example, the configuration bit Q_PKT_CASE[0] associated with the selected queue Q0 will have a logic '1' value, thereby causing multiplexer 210 to route the queue-based case number value CASE_NO_Q0[3:0] stored in case mode register 200. Note that under these conditions, the retrieved queue-based case number value (e.g., CASE_NO_Q0[3:0]) is routed to multiplexer 215 as the selected case number value CASE_SEL[3:0].

Lite-to-sRIO translation logic 112 uses the retrieved queue-based case number (i.e., CASE_SEL[3:0]) to select one of the sixteen case scenario registers $SC_0$-$SC_{15}$. As described above, each of the sixteen case scenario registers $SC_0$-$SC_{15}$ stores corresponding sRIO packet header information. The sRIO packet header information in the selected case scenario register is routed through multiplexer 215. Processing then proceeds to A_DATA_TRANSFER state 307.

Within A_DATA_TRANSFER state 307, Lite-to-sRIO translation logic 112 constructs a sRIO packet header using the sRIO packet header information retrieved from the selected case scenario register. Lite-to-sRIO translation logic 112 also uses a source ID value associated with the selected queue to construct the sRIO packet header. Lite-to-sRIO translation logic 112 then transmits the constructed sRIO packet header to the first port 1, along with the associated packet data retrieved from the selected queue. If the packet size of the retrieved Lite packet is double-word aligned (DATA_ALIGN=1), then processing returns to IDLE state 301 after all of the packet data have been sent to the first port 1.

If the packet size of the retrieved Lite packet is not double-word aligned (DATA_UNALIGN=1), then not all of the bytes in the last double-word of the retrieved Lite packet will be transferred to the first port 1 during A_DATA_TRANSFER state 307. Thus, processing proceeds to U_DATA_TRANSFER state 308, wherein the remaining bytes in the last double word of the retrieved Lite packet are processed. Within U_DATA_TRANSFER state 308, Lite-to-sRIO translation logic 112 retransmits the previously constructed sRIO packet header to the first port 1. Lite-to-sRIO translation logic 112 then transmits the remaining bytes of the last double word of the retrieved Lite packet to the first port 1. Processing then returns to IDLE state 301.

Returning now to Step 304, if the configuration bit Q_PKT_CASE[m] associated with the selected queue Qm specifies the packet-based case mode, then processing proceeds to PACKET_CASE state 306. Under these conditions, Lite-to-sRIO translation logic 112 will retrieve a case number value specified by the Lite packet read from the selected queue. More specifically, Lite-to-sRIO translation logic 112 will retrieve the case number value (CASE_NO[3:0]) from the header of the Lite packet read from the selected queue. In the present example, the configuration bit Q_PKT_CASE[0] associated with the selected queue Q0 would have a logic '0' value in the packet-based case mode, thereby causing multiplexer 210 to route the packet-based case number value CASE_NO[3:0] from the Lite packet header. Note that under these conditions, the retrieved packet-based case number value (e.g., CASE_NO[3:0]) is routed to multiplexer 215 as the selected case number value CASE_SEL[3:0].

Lite-to-sRIO translation logic 112 uses the retrieved packet-based case number (i.e., CASE_SEL[3:0]) to select one of the sixteen case scenario registers $SC_0$-$SC_{15}$. As described above, each of the sixteen case scenario registers $SC_0$-$SC_{15}$ stores corresponding sRIO packet header information. The sRIO packet header information in the selected case scenario register is routed through multiplexer 215. Processing then proceeds to ASC_DATASC_TRANSFER state 307, and continues in the manner described above.

In the above-described manner, Lite packets received on the second port 2 can be translated to sRIO packets transmitted to the first port 1, using predetermined sRIO protocol information stored in sixteen case scenario registers $SC_0$-

$SC_{15}$. Different sRIO packet types can be supported by different case scenario registers. Using the packet-based case mode, different Lite packets stored in the same queue can be translated to sRIO packets having different sRIO protocol information.

If a Lite packet read from the selected queue is not double-word aligned, data segmentation is performed, and the Lite packet data is sent out in two sRIO packets. The first sRIO packet transfers all packet data until the last double-word of the Lite packet data. The second sRIO packet will transfer the remaining bytes within the last double-word of the Lite packet data.

SRIO-to-Lite translation logic 111 will now be described in more detail.

Figure 4:
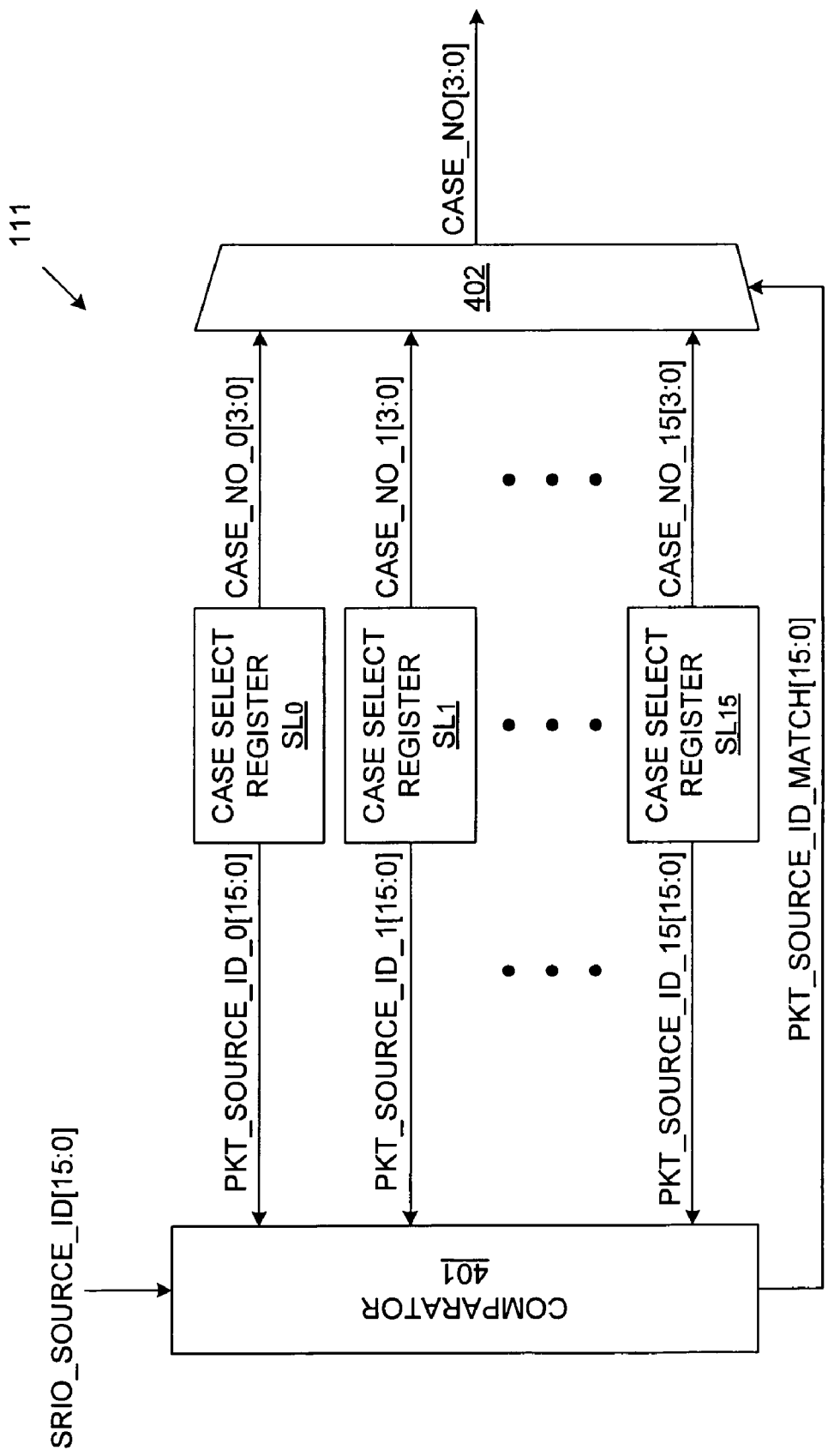
FIG. 4 is a block diagram illustrating additional translation logic present within the serial buffer of FIG. 1, in accordance with one embodiment of the present invention.

FIG. 4 is a block diagram 400 illustrating circuitry present within sRIO-to-Lite translation logic 111 in accordance with one embodiment of the present invention.

SRIO-to-Lite translation logic 111 includes comparator 401, multiplexer 402 and case select registers $SL_0$-$SL_{15}$. Each case select register $SL_n$ (wherein n=0 to 15, inclusive) stores corresponding Lite packet header information. More specifically, each case select register $SL_n$ stores a corresponding case number value, CASE_NO_n[3:0]. The case number value stored in each case select register $SL_n$ can be used to construct Lite packet headers in a manner understood by those of ordinary skill in the art. In accordance with the present invention, each of the case select registers $SL_0$-$SL_{15}$ is programmed to store a different corresponding case number value.

Each case select register $SL_n$ is also programmed to store a corresponding source ID value, PKT_SOURCE_IDSC$_n$[15:0]. Comparator 401 is configured to compare the source ID value (SRIO_SOURCE_ID[15:0]) of each incoming sRIO packet received from the first port 1 with each of the source ID values stored in case select registers $SL_0$-$SL_{15}$. Upon detecting a match, comparator 401 activates a corresponding bit within match indicator signal, PKT_SOURCE_ID_MATCH [15:0]. More specifically, if comparator 401 determines that the incoming source ID value SRIO_SOURCE_ID[15:0] matches the source ID value stored in case select register $SL_n$, then comparator 401 activates the corresponding match indicator bit, PKT_SOURCE_ID_MATCH[n].

The match indictor signal PKT_SOURCE_ID_MATCH [15:0] is used to control multiplexer 402. More specifically, an activated bit PKT_SOURCE_ID_MATCH[n] within the match indicator signal PKT_SOURCE_ID_MATCH[15:0] causes multiplexer 402 to route the case number CASE_NO_n[3:0] from the corresponding case select register $SL_n$.

Figure 5:
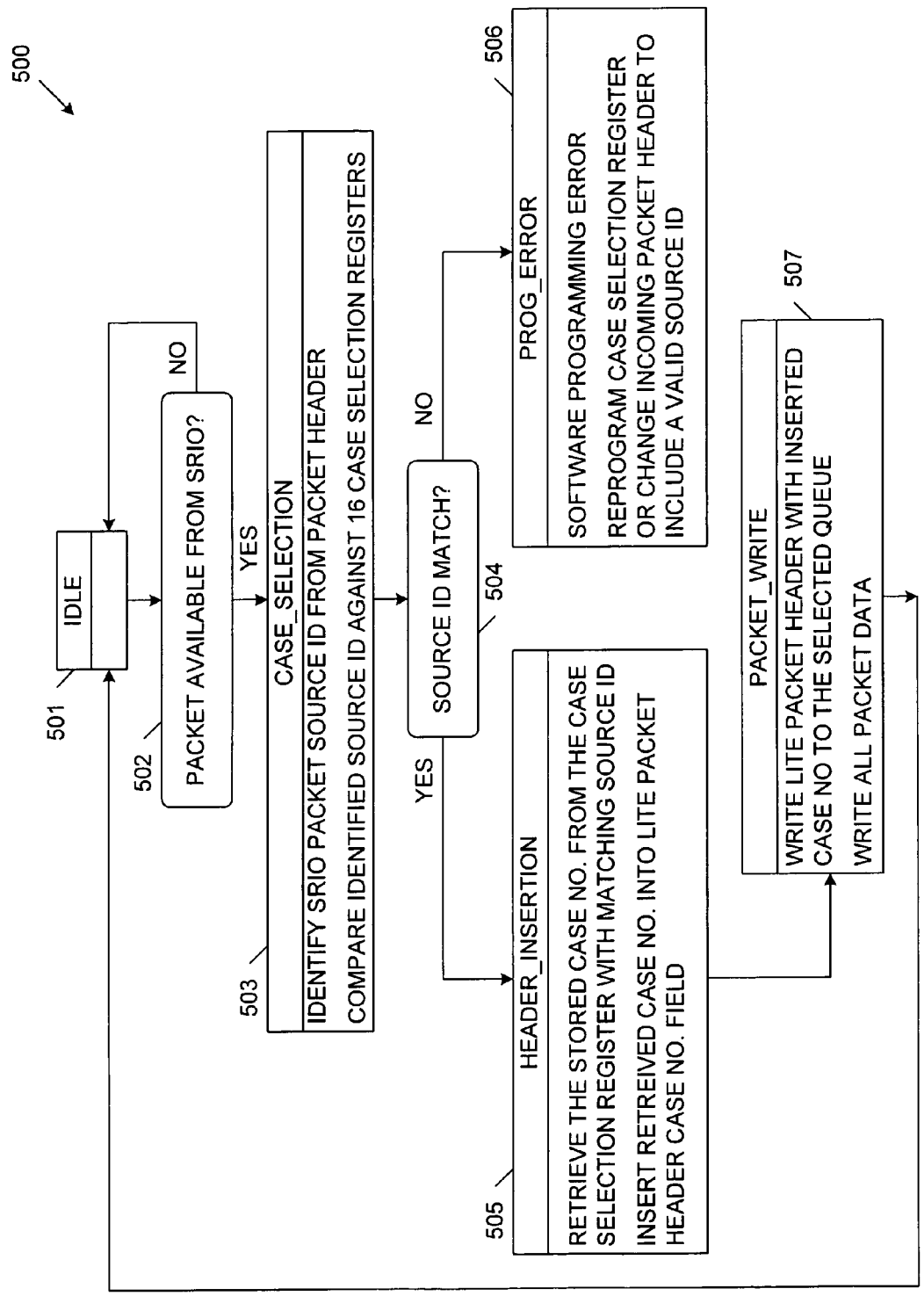
FIG. 5 is a flow diagram illustrating the operation of the translation logic of FIG. 4, in accordance with one embodiment of the present invention.

FIG. 5 is a flow diagram 500 illustrating the operation of sRIO-to-Lite translation logic 111 in accordance with one embodiment of the present invention.

As illustrated in FIG. 5, sRIO-to-Lite translation logic 111 is initially in an IDLE state 501. sRIO-to-Lite translation logic 111 will remain in IDLE state 501 as long as no sRIO packets are available from sRIO port 1 (Step 502, No branch). While in IDLE state 501, if a sRIO packet is available from sRIO port 1 (Step 502, Yes branch), then processing will proceed to CASE_SELECTION state 503. The incoming sRIO packet will include a source ID value, which identifies the source of the incoming sRIO packet, and a destination ID value, which identifies the queue to which the incoming sRIO packet should be written. This identified queue is hereinafter referred to as the selected write queue. Note that in the described embodiments, the selected write queue is one of queues Q4-Q7.

Within CASE_SELECTION state 503, sRIO-to-Lite translation logic 111 extracts the source ID value (SRIO_SOURCE_ID[15:0]) from the header of the incoming sRIO packet, and compares this extracted source ID value with the source ID values stored in case selection registers $SL_0$-$SL_{15}$. As described above in connection with FIG. 4, this comparison operation is performed within comparator 401.

If comparator 401 does not detect a match (Step 504, No branch), then processing proceeds to PROG_ERROR state 506. Within this state 506, sRIO-to-Lite translation logic 111 indicates a software programming error exists, and will reprogram the source ID values stored in case selection registers $SL_0$-$SL_{15}$, or request that the incoming packet header be changed to include a valid source ID value.

If comparator 401 detects a match (Step 504, Yes branch), then processing proceeds to HEADER_INSERTION state 505. Within HEADER_INSERTION state 505, sRIO-to-Lite translation logic 111 identifies the case selection register $SL_n$ that stores the source ID value (PKT_SOURCE_ID_n[15:0]) that matches the source ID value of the incoming sRIO packet. SRIO-to-Lite translation logic 111 then retrieves the case number value (CASE_NO_n[3:0]) stored in this identified case selection register $SL_n$. SRIO-to-Lite translation logic 111 then uses this retrieved case number value to construct a Lite packet header. More specifically, SRIO-to-Lite translation logic 111 inserts the retrieved case number value into a case number field of a Lite packet header. SRIO-to-Lite translation logic 111 also inserts other header information derived from the incoming sRIO packet header (e.g., as packet ID) into the constructed Lite packet header. Processing then proceeds to PACKET_WRITE state 507.

Within PACKET_WRITE state 507, SRIO-to-Lite translation logic 111 causes write control logic 101 to write the constructed Lite packet header into the selected write queue. SRIO-to-Lite translation logic 111, then causes write control logic 101 to write all packet data from the incoming sRIO packet into the selected write queue. Processing then returns to IDLE state 501. Note that a packet written to the selected write queue in the above-described manner has been effectively translated to be consistent with the Lite-weight protocol. Thus, when this translated packet is subsequently read out, the second port 2 is able to identify the packet type and origin of this packet.

Although the present invention has been described in connection with various embodiments, it is understood that variations of these embodiments would be obvious to one of ordinary skill in the art. For example, although sRIO-to-Lite translation logic 111 is located between the first port 1 and the queues Q4-Q7 in the described embodiments, it is understood that sRIO-to-Lite translation logic may be located between queues Q4-Q7 and the second port 2 in other embodiments. Similarly, although Lite-to-sRIO translation logic 112 is located between queues Q0-Q3 and the second port in the described embodiments, it is understood that Lite-to-sRIO translation logic 112 may be located between the second port and queues Q0-Q3 in other embodiments. Moreover, although queues Q4-Q7 are assigned to sRIO-to-Lite translation logic 111, and queues Q0-Q3 are assigned to Lite-to-sRIO translation logic 112, it is understood that other queue assignments are possible in other embodiments of the present invention. Thus, the present invention is limited only by the following claims.

We claim:
1. A serial buffer comprising:
a first port configured to operate in accordance with a first serial protocol;
a second port configured to operate in accordance with a second serial protocol, different than the first serial protocol;

one or more queues that store packets received by the first port;

a first translation circuit that receives the packets stored by the one or more queues, and translates these packets from a first format consistent with the first serial protocol to a second format consistent with the second serial protocol, the first translation circuit including:

a plurality of case scenario registers, each storing a corresponding set of predetermined header information consistent with the second serial protocol; and selection logic that selectively accesses one of the case scenario registers in response to each of the packets received from the one or more queues, wherein the selection logic has a first configuration in which the case scenario registers are accessed in response to case number values included in the packets received from the one or more queues, and a second configuration in which the case scenario registers are accessed in response to one or more case number values assigned to the one or more queues.

2. The serial buffer of claim 1, further comprising a second translation circuit configured to translate packets received by the second port from a third format consistent with the second serial protocol to a fourth format consistent with the first serial protocol.

3. The serial buffer of claim 2, wherein the first format is identical to the fourth format, and the second format is identical to the third format.

4. The serial buffer of claim 1, wherein the first serial protocol comprises a Lite-weight protocol, and the second serial protocol comprises a serial rapid IO (sRIO) protocol.

5. The serial buffer of claim 1, further comprising a second translation circuit that includes:

a plurality of case selection registers, each configured to store a corresponding source identification value and a corresponding case number value; and means for retrieving the case number value from a case selection register if a source identification value present in a packet received by the first port matches the source identification value stored in the case selection register.

6. The serial buffer of claim 5, wherein the second translation circuit is configured to construct a packet that includes the retrieved case number value and has the second format.

7. The serial buffer of claim 1, wherein the first translation circuit further comprises means for segmenting packets received from the first port if the packets received from the first port are not aligned in a manner consistent with the second serial protocol.

8. A method of operating a serial buffer comprising:

receiving packets having a first format defined by a first serial protocol on a first port of the serial buffer, wherein each of the packets having the first format includes a case number value;

storing the packets received by the first port in one or more queues;

assigning a case number value to each of the one or more queues;

specifying, for each of the one or more queues, whether each of the one or more queues is accessible in a queue-based manner or a packet-based manner;

retrieving the packets stored in the one or more queues;

for each packet retrieved from a queue accessible in the queue-based manner, generating a translated packet having a second format consistent with a second serial protocol in response to the case number value assigned to the queue from which the packet is retrieved; and for each packet retrieved from a queue accessible in the packet-based manner, generating a translated packet having the second format in response to the case number value included in the retrieved packet.

9. The serial buffer of claim 8, wherein the first serial protocol comprises a Lite-weight protocol, and the second serial protocol comprises a serial rapid IO (sRIO) protocol.

10. The serial buffer of claim 1, wherein predetermined header information is retrieved each time the case scenario registers are accessed, and wherein the first translation circuit includes means for providing packets having the second format and including the retrieved predetermined header information.

11. The serial buffer of claim 1, wherein the selection logic comprises a multiplexer associated with each of the one or more queues, wherein each multiplexer is coupled to receive case number values included in the packets received from the associated one of the one or more queues, and the case number value assigned to the associated one of the one or more queues.

12. The method of claim 8, further comprising transmitting each translated packet to a second port of the serial buffer.

13. The method of claim 12, further comprising storing a plurality of sets of predetermined header information consistent with the second format in a corresponding plurality of case scenario registers, wherein each translated packet is generated by retrieving a set of predetermined header information from a corresponding one of the case scenario registers in response to a case number value.

14. The method of claim 13, wherein the sets of predetermined header information correspond with different packet types of the second serial protocol.

15. The method of claim 12, further comprising:

receiving one or more packets having the second format on the second port of the serial buffer, each including a source identification value;

defining a plurality of case selection registers, each storing a source identification value and a corresponding case number value;

comparing the source identification value of each of the one or more packets received on the second port with the source identification values stored in the case selection registers, and upon detecting a match, retrieving the case number value from the case selection register that stores the matching source identification value; and generating a translated packet having a header that includes the case number value retrieved from the case selection register, wherein the translated packet has the first format.

* * * * *